Oct. 31, 1944.                    G. SMITH                    2,361,572
                              INDICATING DEVICE
                    Filed June 9, 1943           3 Sheets-Sheet 1
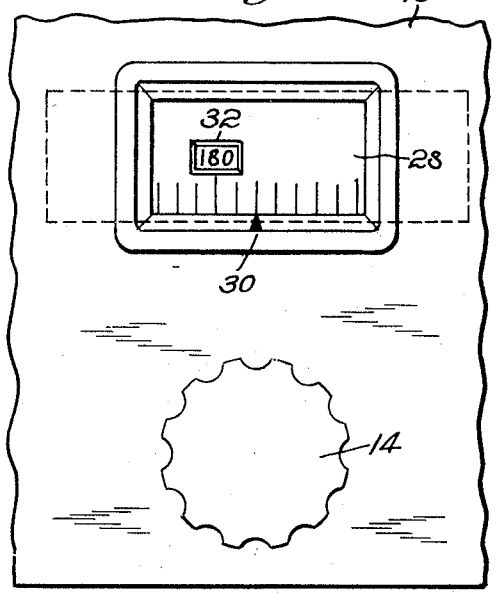
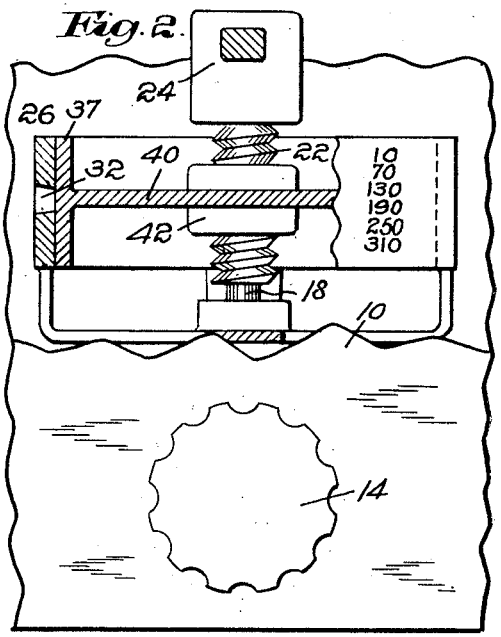
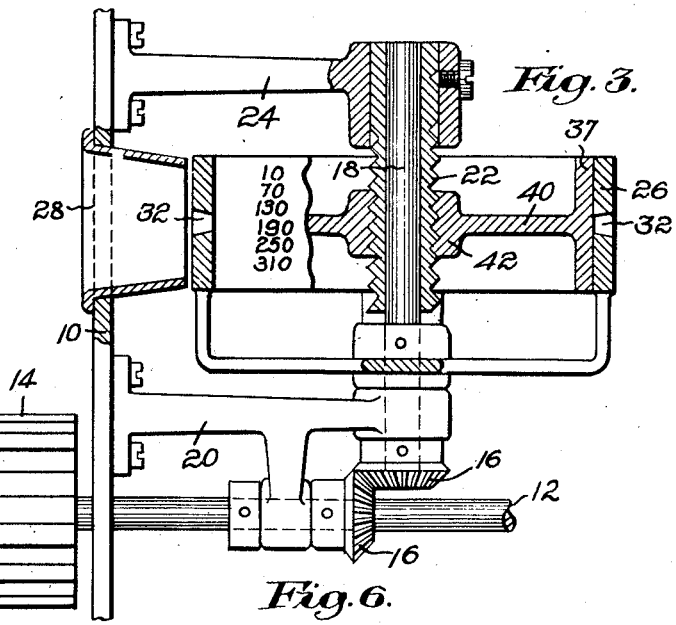
| 0   | 10  | 20  | 30  | 40  | 50  |
|-----|-----|-----|-----|-----|-----|
| 60  | 70  | 80  | 90  | 100 | 110 |
| 120 | 130 | 140 | 150 | 160 | 170 |
| 180 | 190 | 200 | 210 | 220 | 230 |
| 240 | 250 | 260 | 270 | 280 | 290 |
| 300 | 310 | 320 | 330 | 340 | 350 |
| 360 |     |     |     |     |     |
Inventor:
Graydon Smith
by Emery, Booth, Townsend, Miller & Weidner Attys Oct. 31, 1944.    G. SMITH    2,361,572
INDICATING DEVICE
Filed June 9, 1943    3 Sheets-Sheet 2

Inventor:
Graydon Smith,
by Emery Booth, Townsend, Miller & Weidner
Attys.

Oct. 31, 1944.  G. SMITH  2,361,572
INDICATING DEVICE
Filed June 9, 1943  3 Sheets-Sheet 3
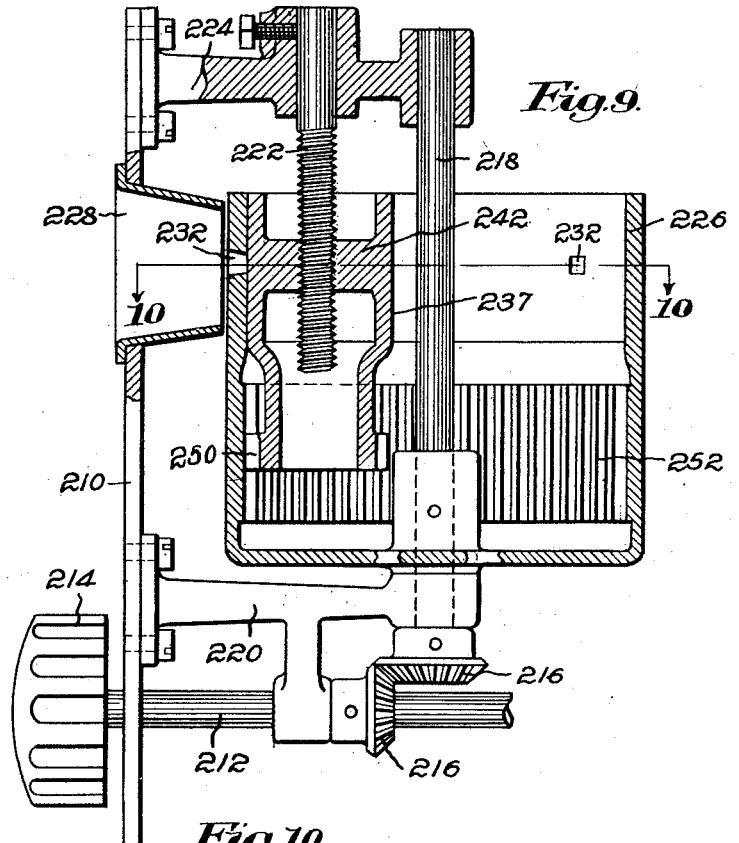
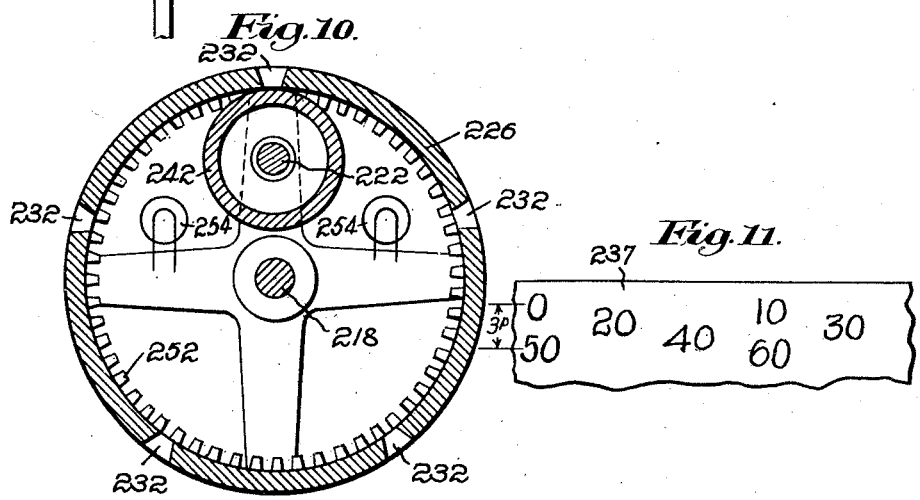
Inventor:
Graydon Smith
by Emery, Booth, Townsend, Miller & Weidner
Attys Patented Oct. 31, 1944

2,361,572

UNITED STATES PATENT OFFICE 2,361,572

INDICATING DEVICE

Graydon Smith, Concord, Mass., assignor to National Company, Inc., Malden, Mass., a corporation of Massachusetts Application June 9, 1943, Serial No. 490,223

11 Claims. (Cl. 116—124.2)

This invention relates to indicating or counting devices for manifesting the extent of movement or angular position of some mechanism. The device embodies a dial graduated to cooperate with an index or orienting point and rotated in timed relation to the movement of the mechanism in such manner as to make more than one turn within the range of movement of the mechanism whereby the dial is of restricted dimension yet with widely spaced graduations. It further embodies also means cooperating with the dial whereby there is given an indication of the position or extent of movement of the mechanism expressed in terms of the graduations as a unit, although the arithmetical value of the indication may exceed the number of graduations of the dial, as where the dial has made more than one turn from zero position. The device finds an application for various purposes, among which may be cited by way of example radio tuning instrumentalities to indicate the adjustment of rotor plates of variable condensers and micrometer calipers wherein the desired measurement is a function of the rotation of a screw.

By way of example in the accompanying drawings I have shown a construction such as would be adaptable for use in a radio receiving set and one wherein the dials are in the form of sleeves or "drums" and which I will hereinafter describe in connection with the accompanying drawings, wherein:

Fig. 1 is a fragmentary front view of a radio receiving set showing the indicator;

Fig. 2 is a similar view with a portion of the front panel broken away;

Fig. 3 is a side elevation as seen from the left of Fig. 1 with parts broken away;

Fig. 6 is a view on a different scale showing the periphery of the inner dial developed in a plane;

Fig. 9 is a view corresponding to a portion of Fig. 3 but showing a further modification;

Fig. 10 is a section, partly diagrammatic, on the line 10—10 of Fig. 9; and

Fig. 11 is a diagram, not to scale or in proportion, showing the periphery of an inner dial such as would be used in the construction of Fig. 9 developed in a plane.

Figure 4:
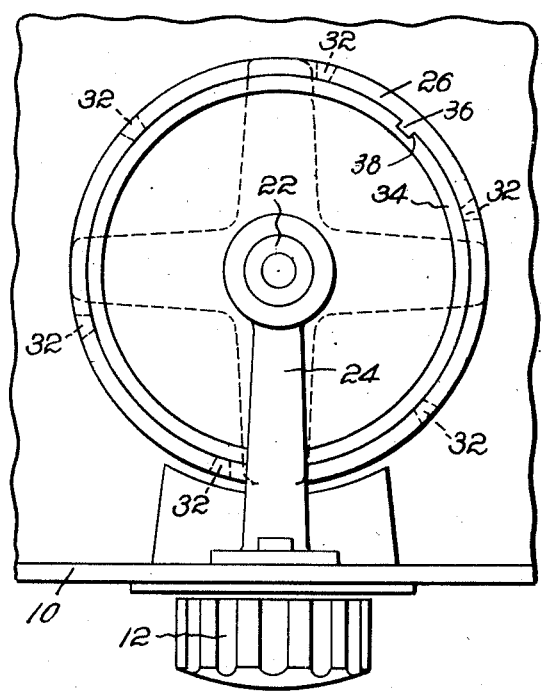
Fig. 4 is a top plan.
Figure 5:
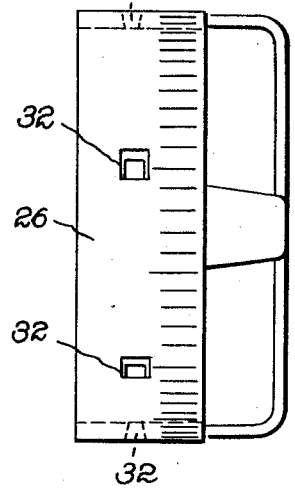
Fig. 5 is an edge view of one of the dials.

For convenience I have shown as an example of my invention and herein disclose an indicator which expresses the complete range of movement of the mechanism to which it is applied as 360 units, the indicator comprising a dial having 60 graduations and which thus rotates six times when the mechanism traverses its range. For instance, we might assume that the units of the scale represented half degrees in the adjustment of condenser rotor plates through a range of 180°. However, the reason for choosing the sexagesimal system for purposes of illustration is because it is easiest to draw.

I believe that my invention can most easily be understood if I first describe in explicit detail the particular embodiment thereof shown by way of example in the accompanying drawings as the principles of operation will thereafter become clear and varying structures which may exemplify those principles will be apparent to those skilled in the art.

Referring, therefore, to Figs. 1 to 5 of the drawings, I there show in a fragmentary fashion a portion of a radio receiving set embodying the front panel 10 through which projects the shaft 12 having an exterior actuating knob 14 for manually turning the same. This shaft 12 is shown broken in the drawings and it will be understood that it is connected to the variable condenser, being suitably geared down, in the example illustrated in the ratio of 12 to 1, six turns of the knob moving the rotor plates through one-half a revolution. Miter gears 16 transmit the rotations of the shaft 12 in 1 to 1 ratio to a dial shaft 18 shown as extending vertically behind the panel and journalled at one end in the bracket 20 and at the other end in an exteriorly threaded quill 22, hereinafter to be described, supported by a bracket 24. This shaft carries a dial 26 of the annular or drum type, rotating herein in a horizontal plane, a portion of which is exposed at the window 28 in the panel, the margin of which window carries the index or orienting mark 30.

The cylindrical periphery of the dial 26 is graduated with 60 graduations, the multiples of 5 and the multiples of 10 conveniently being longer than the others in usual manner as shown. The dial turns once on each rotation of the knob 14, moving 60 of the graduations past the index 30, and in the complete range of adjustment of the condenser the dial turns six times. In order to indicate the position of the condenser in terms expressive of so many 360ths of its range from a zero position means are provided whereby there are presented adjacent the graduations representing the multiples of ten a numeral expressive of the number of graduations through which the mechanism has moved from the zero position. In the present instance, for reasons which will hereinafter appear, the cylindrical surface of the dial is extended, upwardly in the example shown, beyond the graduated periphery and is provided with six openings 32 (see Fig. 6) equally spaced therearound in line with the location of the graduations which express multiples of ten. Substantially housed within the outer dial 26 is an inner dial 34 likewise of drum-like form telescoping within and adapted to be entrained in rotation with the outer dial, herein in 1 to 1 ratio, by means of the rib or key 36 projecting inwardly from the outer dial and working in an axial slot 38 in the periphery of the inner dial, thus leaving the inner dial free to slide, vertically in the example shown, within the wall of the outer dial. The inner dial 34 is provided with a web 40 formed with a central nut 42 which runs on a screw thread formed on the quill 22 previously referred to and which is non-rotatably held by the bracket 24. It will thus be seen that on each rotation of the outer dial the inner dial will likewise rotate once and will be shifted axially of the two dials, or vertically in the example shown, an amount equal to the pitch of the screw.

Referring now to Fig. 6 wherein the periphery of the inner dial is shown developed in a plane, that is, as if the cylinder were slit along one of its elements and laid out flat, the inner dial is inscribed with numerals which in the present instance are the multiples of 10 from 0 to 360, the angular spacing of these numerals being the same as the angular spacing of the openings 32 in the outer dial, that is ⅙ of a circumference in the present instance, and the numerals forming a helix, the pitch of which is the same as the pitch of the screw. Because of the limited space available on the sheet and the desire not to make a figure of the drawings unduly small, Fig. 6 is on the same scale vertically (axially of the cylinder) as Figs. 1 to 5 but has been compressed horizontally (circumferentially of the cylinder) and is to that extent diagrammatic when taken with the other more realistically drawn figures. In other words, the helix in Figs. 1 to 5 would be of the same pitch but of greater radius than that shown developed in Fig. 6.

Referring now to Fig. 1, in which the dial is shown substantially in the mid position of adjustment of the mechanism to which it is attached, the numeral 180 appears at the opening 32 which is opposite the window 28 and adjacent the index 30, and in Fig. 1 we read that the position of the condenser is that defined by the value 182, that is, $182\frac{2}{360}$ between its two extreme positions. A vertical row of numerals as shown in Fig. 6 is aligned with each of the openings 32 and because of the axial adjustment of the dial along screw 22 the numeral 180, the fourth from the top of that row, is the one which appears at the opening 32 which is opposite the window 28.

Now, if the knob is given one more rotation, the same opening 32 will again appear at the window 28. The inner dial 34, however, will have been shifted axially upwardly by the action of the screw for a distance equal to one pitch of the helix formed by the numbers so that the numeral 240 is now exposed at the opening. A still further half-turn of the dial would bring the diametrically opposite opening 32 beneath the window, the additional axial movement of the dial would be ½ the pitch of the screw or ½ the pitch of the helix which the numerals form, and the numeral 270 would be brought beneath that opening.

It will thus be seen that throughout the range of the instrument corresponding to six turns of the knob 14 there will be a constant indication expressing by means of the numbers indicating the multiples of 10 and by the graduations indicating the units. Thus the reading 182 in Fig. 1 expresses the movement of the mechanism which is adjusted such as the variable condenser in terms of a graduation as a unit and shows a movement from the zero position of 182 units or $182\frac{2}{360}$ of its range. Assuming the drum 26 to be three inches in diameter, the graduations thereon are a little more than $\frac{5}{32}$ of an inch apart with every tenth graduation marked and, as far as the operation goes, the effect is the same as if we had a drum eighteen inches in diameter with a scale over fifty-six inches long marked with 361 graduations spaced the same distance apart, which traverses past the index 30 as the parts are adjusted.

In the form of the invention shown wherein the two dials move synchronously or in 1 to 1 ratio, the vertical rows of figures, viewing Fig. 6, are always angularly aligned with the openings 30 and centered in a horizontal direction, viewing Fig. 1. As regards the opening 30 which is presented forwardly under the window 48 in Fig. 1, the arrangement is such that the numeral is centered in a vertical plane when at the index. During the movement of the mechanism and the axial displacement of the inner dial this numeral drifts vertically relative to the horizontal center line of the opening. Such motion is very slight since during one revolution of the dial the movement is equal to the pitch of the helix of the numbers, and if only a fraction of the circumference is exposed at the window 48 the vertical movement at either side of the center line is a corresponding fraction of that small pitch. Thus the numerals are effectively stationary during their traverse past the window and the effect is of a dial with fixed numerals adjacent the cardinal divisions of a scale traversing the window, this apparent scale, as already suggested, being 360 units in length with 361 graduations from 0 to 360, including the two end points.

Figure 8:
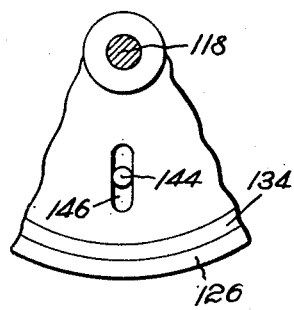
Fig. 8 is a detail of Fig. 7.
Figure 7:
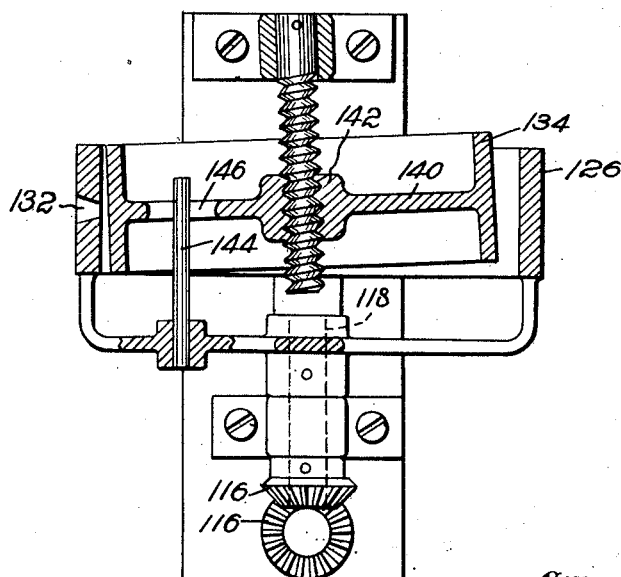
Fig. 7 shows a modification and is essentially a section through the center line of the dials in a plane parallel to the front panel.

In Figs. 7 and 8, however, I have shown an arrangement wherein the vertical drift of the numerals is compensated for. In these figures parts which correspond to those in Figs. 1 through 6 are designated by like numerals increased by 100. The parts are similar except that the shaft 118 carries the outer dial 126 in overhung relation from the bracket 120, to permit the inner dial 134 to be mounted on the screw 122, the axis of which is disposed at an angle to the axis of the shaft, the angle being equal to the pitch of the helix formed by the numerals on the inner dial. In Fig. 7 this angle has been shown with the intention of making the fact that there is an angular relation graphically obvious. It is not intended as a scale representation of the relative dimensions involved. In view of the angular position of the two dials, the drive is herein effected by a pin 144 projecting from one of the supporting arms of the outer dial and working in a radial slot 146 in the web 140 of the inner dial (see Fig. 8) and causing rotation of the two in 1 to 1 ratio. By virtue of the relatively angular position of the two dials, the helical arc occupied by the numerals adjacent the window at any given time is disposed horizontally and the numerals as they move into position for observation move horizontally without vertical drift across the openings.

The numerals of the inner dial in those spires of the helix which in Figs. 1 and 2 are below that one which is seen through the window 28 are hidden by the graduated portion of the outer dial 26. It is convenient to hide those which at any moment are above by an extension of the dial itself, as herein, and in that case the openings 32 referred to are provided to permit the display of the numerals adjacent the graduated scale. A construction utilizing such openings is also useful in that they frame and emphasize the inscriptions which, however, independent of the openings or of the existence of intermediate parts of the external dial in circumferential alignment therewith are, in the case of dials synchronously rotating as shown, always angularly aligned with the cardinal divisions of the scale.

A direct numerical indication by multiples of five could be given in the construction shown by providing twelve windows spaced thirty degrees and inscribing multiples of five on dial 32 with an angular spacing of thirty degrees between successive multiples.

As I have already stated, I have disclosed a range of 360 units because the division of a circle into six, or 60 degree, parts made it easier to execute the accompanying drawings. There is nothing particularly important about this system of numeration. For instance, we might divide the range of the mechanism into 500 parts, graduate the outer dial for 50 units, and the outer dial would make ten revolutions during the range and, in the case of a synchronous movement of the dials, to disclose multiples of ten inscribed in a spiral series on the inner dial there would be five openings if a construction of outer dial requiring such openings to expose the significant numerals were adopted. Equally we might have a binary system in which the various graduations represented, say, 16ths of a unit and the numerals after zero were 1, 2, 3, 4, etc., representing $16/16$, $32/16$, and so on. In any instance the angular distance between successive numbers corresponds to that of a sub-multiple or aliquot part of the total number of graduations in the scale of the outer dial, the difference between consecutive numbers being equal to a plurality of the units indicated by the graduations.

In Figs. 9 and 10 I have shown an arrangement of dials wherein the angular speed ratio is not unity. In those figures the parts corresponding to those of Figs. 1 through 5 are designated by the same number increased by 200.

The outer diameter of the inner dial or drum 237, in the example illustrated, is one-third the inner diameter of the outer drum 226 and the former drum positioned internally tangent to the latter opposite the window 228. The hub 242 of the inner drum is mounted on the depending stationary screw 222. To gear together the inner and the outer drums to move angularly in three to one ratio, drum 237 may carry at its lower end a gear 250, the pitch diameter of which is equal to the outer diameter of the drum, and which meshes in all positions of vertical adjustment of the drum with a broad-faced internal gear 252 having a pitch diameter equal to the inner diameter of the outer drum 226 and mounted to turn therewith. The internal gear 252 is spaced below the lower rim of drum 226 a distance at least half the range of vertical movement of the inner drum 237 to permit movement of the latter without interference of the outer portions of the teeth of either gear with the drum which carries the other. By this arrangement the inner drum makes three turns to each turn of the other drum, their angular speeds are in the ratio of three to one, but their peripheral speeds are the same.

In a construction of the type now being described the number of openings 232 in the outer drum should be relatively prime to the number of revolutions which the inner drum makes to each revolution of the outer. We may, for example, take five, as best shown in Fig. 10, and consider that the indications of the device are given on a decimal system with fifty units corresponding to each complete turn of the outer drum, the numerical indications being by multiples of ten.

In Fig. 11 I have shown diagrammatically the inscribed face of the inner drum 237 developed in a plane. This diagram is not to scale with the other figures and the vertical distances are exaggerated as compared with the circumferential distances. The numerals are helically arranged and the linear distance between successive numerals (multiples of ten) is the same as the linear distance between two successive openings 232 of the outer drum. The numerically successive values therefore occur three-fifths of a circumference apart and they do not fall in the same radial plane of the inner drum except at recurrent intervals, numbers differing by 50 falling in vertical alignment after three turns of the helix. That is, 50, viewing Fig. 11, will be immediately under 0 but the intermediate multiples of ten will be out of line as shown.

Now, considering the numerals 0 and 50, their center points must be a minimum vertical distance apart, substantially fixed for a given size of numeral. The intermediate numbers are arranged on a helix that makes three turns in advancing from the center line of the 0 to the center line of 50 and this is possible with a small spacing of 0 and 50 because the numeral 20, for instance, falls into the space between the numerals 0 and 10 and its upper portion may project up into the space between them. The pitch of the screw 222 is the same as that of the helix, indicated by the reference numeral $p$ in Fig. 11, and is one-third of the vertical distance between the centers of aligned numbers such as 0 and 50 and 10 and 60. On three revolutions of the dial from the 0 position when 50 comes to view, the inner drum will have been shifted upwardly the distance $3p$ to center the numeral 50 behind the opening 232 that is then behind the window 228. This arrangement permits a screw 222 of relatively fine pitch to be used.

The linear distance between numerically successive numbers is in all cases equal to the distance between the openings in the outer dial. The distance between successive numbers in an arrangement such as is illustrated in Fig. 3 is therefore relatively great. Thus Fig. 6 is compressed horizontally viewing the figure, but the spaces between successive numerals even as shown are long. In an arrangement like Fig. 9 the same number of numerals of the same size and with the same effective vertical spacing can be inscribed on a drum of smaller diameter but of no greater altitude.

In Fig. 10 I have shown diagrammatically electric lamps 254 installed within the outer drum 226 at either side of the point of tangency of the inner drum 237 therewith and adapted to illuminate the numeral which is behind the opening 232 which is at the point of tangency and exposed for observation at window 228.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. In an indicating mechanism a dial rotatable through a plurality of revolutions and having a scale of graduations extending about its periphery providing for orientation of the dial relative to an index, an inner dial having a series of equally spaced numerals expressive of sub-multiples of the scale of graduations, the numerals being angularly spaced in accordance with such scale and arranged spirally, means to cause rotation of the inner dial in synchrony with the first dial, and means for translating the inner dial through a distance equal to the pitch of the spiral as the outer dial makes one revolution whereby the successive numerals successively pass the index adjacent the scale of graduations as the outer dial is rotated, the parts being constructed and arranged to expose for observation the numeral so passing and to obscure the numerals of adjacent turns of the spiral.

2. In an indicating mechanism an annular or drum type dial rotatable through a plurality of revolutions and having a scale of graduations extending about its periphery providing for orientation of the dial relative to an index, an inner drum type dial having helically arranged about its cylindrical surface successive numerals expressive of sub-multiples of the scale of graduations, the numerals being angularly spaced in accordance with such scale, means for entraining the inner dial with the outer to rotate therewith, and means to shift the inner dial axially through a distance equal to the pitch of the helix on each revolution whereby the successive numerals pass the index adjacent the scale of graduations as the outer dial is rotated, the parts being constructed and arranged to expose for observation the numeral so passing and to obscure the numerals of adjacent spires of the helix.

3. In an indicating mechanism an annular or drum type dial rotatable through a plurality of revolutions and having a scale of graduations extending about its periphery providing for orientation of the dial relative to an index, an inner drum type dial having helically arranged about its cylindrical surface successive numerals expressive of sub-multiples of the scale of graduations, the numerals being angularly spaced in accordance with such scale, means for entraining the inner dial with the outer to rotate therewith, and means to shift the inner dial axially through a distance equal to the pitch of the helix on each revolution comprising a fixed screw on which the inner dial is mounted to turn whereby the successive numerals pass the index adjacent the scale of graduations as the outer dial is rotated, the parts being constructed and arranged to expose for observation the numeral so passing and to obscure the numerals of adjacent spires of the helix.

4. In an indicating mechanism an annular or drum type dial rotatable through a plurality of revolutions and having a scale of graduations extending about its periphery providing for orientation of the dial relative to an index, an inner drum type dial having helically arranged about its cylindrical surface successive numerals expressive of sub-multiples of the scale of graduations, the numerals being angularly spaced in accordance with such scale, means for entraining the inner dial with the outer to rotate therewith, and means to shift the inner dial axially through a distance equal to the pitch of the helix on each revolution whereby the successive numerals pass the index adjacent the scale of graduations as the outer dial is rotated, the parts being constructed and arranged to expose for observation the numeral so passing and to obscure the numerals of adjacent spires of the helix, the axis of the inner dial being so inclined to the axis of the first that the helical arc of those numerals moving adjacent the index will be in a plane substantially perpendicular to the axis of the outer dial.

5. In an indicating mechanism an outer dial rotatable through a plurality of revolutions and having a circular series of openings equally spaced about the periphery thereof, the dial having graduations subdividing the spaces between the openings and providing for orientation of the dial relative to an index, an inner dial having numerals expressive of multiples of the number of graduations between successive openings, the numerals being spirally arranged with an angular spacing proportional to the spacing of the openings of the first dial, means to rotate the inner dial through an angle similarly but inversely proportional to the angular movement of the outer dial, and means to translate the second dial on each revolution of the outer dial through a distance similarly proportional to the pitch of the spiral, whereby on continued revolution of the outer dial successive numerals are successively presented for observation through the openings successively passing the index to indicate at the index the rotative position of the dial in terms of its graduations as a unit of measure.

6. In an indicating mechanism an outer dial rotatable through a plurality of revolutions and having a circular series of openings equally spaced about the periphery thereof, the dial having graduations subdividing the spaces between the openings and providing for orientation of the dial relative to an index, an inner dial having numerals expressive of multiples of the number of graduations between successive openings, the numerals being spirally arranged with an angular spacing equal to the spacing of the openings of the first dial, means to cause rotation of the second dial in synchrony with the first dial and means for translating the second dial through a distance equal to the pitch of the spiral as the first dial makes one revolution, whereby on contined revolution of the outer dial successive numerals are successively presented for observation through the openings successively passing the index to indicate at the index the rotative position of the dial in terms of its graduations as a unit of measure.

7. In an indicating mechanism an outer annular sleeve or drum dial rotatable through a plurality of revolutions having a circular series of openings about its periphery, the dial having graduations subdividing the spaces between the openings and providing for orientation of the dial relative to an index, an inner annular or drum dial received substantially within the other dial and having helically arranged around its cylindrical surface numerals expressive of multiples of the number of graduations between successive openings, the angular spacing of the numerals being equal to that of the openings, means for entraining the second dial with the first to rotate therewith, and means to shift the second dial axially through a distance equal to the pitch of the helix on each revolution, whereby on continued revolution of the outer dial successive numerals are successively presented for observation through the openings successively passing the index to indicate at the index the rotative position of the dial in terms of its graduations as a unit of measure.

8. In an indicating mechanism an outer annular sleeve or drum dial rotatable through a plurality of revolutions having a circular series of openings about its periphery, the dial having graduations subdividing the spaces between the openings and providing for orientation of the dial relative to an index, an inner annular or drum dial received substantially within the other dial and having helically arranged around its cylindrical surface numerals expressive of multiples of the number of graduations between successive openings, the angular spacing of the numerals being proportional to that of the openings, means to turn the inner dial a distance similarly but inversely proportional to the angular movement of the outer dial, and means for axially shifting the inner dial on each revolution of the outer dial a distance similarly proportional to the pitch of the helix, the axis of the second dial being so inclined to the axis of the first that the helical arc of those numerals moving adjacent the index will be substantially in the plane of the openings.

9. In an indicating mechanism an outer annular sleeve or drum dial rotatable through a plurality of revolutions having a circular series of openings about its periphery, the dial having graduations subdividing the spaces between the openings and providing for orientation of the dial relative to an index telescoped within the first and connected thereto in relatively non-rotatable relation and having helically arranged around its cylindrical surface numerals expressive of multiples of the number of graduations between successive openings, the angular spacing of the numeral being equal to that of the openings, and means for axially shifting the inner dial within the outer dial through a distance equal to the pitch of the helix on each revolution, whereby on continued revolution of the outer dial successive numerals are successively presented for observation through the openings successively passing the index to indicate at the index the rotative position of the dial in terms of its graduations as a unit of measure.

10. In an indicating mechanism an outer annular sleeve or drum dial rotatable through a plurality of revolutions having a circular series of openings about its periphery, the dial having graduations subdividing the spaces between the openings and providing for orientation of the dial relative to an index, an inner annular or drum dial received substantially within the other dial and having helically arranged around its cylindrical surface numerals expressive of multiples of the number of graduations between successive openings, the angular spacing of the numerals being proportional to that of the openings, means to turn the inner dial a distance similarly but inversely proportional to the angular movement of the outer dial, and means for axially shifting the inner dial on each revolution of outer dial a distance similarly proportional to the pitch of the helix.

11. In an indicating mechanism an outer drum dial rotatable through a plurality of revolutions having a circular series of openings about its periphery, the dial having graduations subdividing the spaces between the openings and providing for orientation of the dial relative to an index, a threaded stationary shaft extending generally in the axis of the dial, a nut on the shaft supporting an inner drum substantially within the outer drum, said inner drum having ranged about its cylindrical surface a helical series of equally spaced numerals expressive of multiples of the number of graduations between successive openings, and means to rotate the inner drum as the outer drum is rotated, the ratios, first, of the pitch of the screw to the pitch of the helix, second, of the speed of the inner dial to the speed of the outer dial and, third, of the number of openings to the number of numerals in a single spire of the helix being the same, whereby on continued rotation of the outer drum successive numerals are successively presented for observation through the openings successively passing the index to indicate at the index the rotative position of the dial in terms of its graduations as a unit of measure.

GRAYDON SMITH.